United States Patent
Buchko, Jr. et al.

(10) Patent No.: US 10,961,093 B2
(45) Date of Patent: Mar. 30, 2021

(54) SIMPLIFIED LIFT MECHANISM FOR A PACKAGING MACHINE

(71) Applicant: CP Packaging, Inc., Appleton, WI (US)

(72) Inventors: Raymond G. Buchko, Jr., Fremont, WI (US); Rodney W. Golla, New London, WI (US)

(73) Assignee: CP Packaging, Inc., Appleton, WI (US)

( * ) Notice: Subject to any disclaimer, the term of this patent is extended or adjusted under 35 U.S.C. 154(b) by 230 days.

(21) Appl. No.: 16/102,116

(22) Filed: Aug. 13, 2018

(65) Prior Publication Data
US 2019/0047834 A1    Feb. 14, 2019

Related U.S. Application Data

(60) Provisional application No. 62/545,025, filed on Aug. 14, 2017.

(51) Int. Cl.
*B66F 7/06*        (2006.01)
*B66F 11/04*       (2006.01)
(Continued)

(52) U.S. Cl.
CPC ............. *B66F 7/06* (2013.01); *B65B 31/02* (2013.01); *B65B 65/00* (2013.01); *B65B 65/02* (2013.01);
(Continued)

(58) Field of Classification Search
CPC ........ B66F 7/06; B66F 7/0641; B66F 7/0691; B66F 11/04; F16H 21/44; F16H 29/02;
(Continued)

(56) References Cited

U.S. PATENT DOCUMENTS 3,343,336 A * 9/1967 Bradford ................. B65B 61/06
                                                    53/329.4
3,524,298 A    8/1970 Hamilton
(Continued)

FOREIGN PATENT DOCUMENTS

EP    0219379    4/1987
EP    2218575    8/2010

OTHER PUBLICATIONS

"Welcome to the World of Multivac(R) Packaging Machines", Multivac brochure 1988.
(Continued)

*Primary Examiner* — Saul Rodriguez
*Assistant Examiner* — Brendan P Tighe
(74) *Attorney, Agent, or Firm* — Boyle Fredrickson, S.C.

(57) ABSTRACT

A lift mechanism for simplifying the raising and lowering of a machine component has a base and a frame structure. The lift mechanism may include a lift arrangement interposed between the base and the frame structure that allows for the raising and lowering of the frame structure about a single lift point. The lift mechanism may also include various shafts, drive members, links, and arms, which in combination translate rotational movement of a motor into linear vertical motion. For instance, a drive link and an arm may be rotatably attached to one another, as well as a drive shaft and a second shaft. Additionally, a drive member may be associated with the motor. In operation, the drive member may be rotated by the motor, and a drive belt transmits rotation of the drive member to the drive shaft, the second shaft, the drive link, and the arm.

12 Claims, 12 Drawing Sheets

(51) Int. Cl.
*B65B 65/02* (2006.01)
*F16H 21/44* (2006.01)
*B65B 31/02* (2006.01)
*B65B 65/00* (2006.01)
*B65B 65/04* (2006.01)
*B65B 51/14* (2006.01)

(52) U.S. Cl.
CPC .............. *B65B 65/04* (2013.01); *B66F 11/04* (2013.01); *F16H 21/44* (2013.01); *B65B 51/14* (2013.01)

(58) Field of Classification Search
CPC . F16H 2007/0891; B65B 31/02; B65B 65/00; B65B 65/02; B65B 65/04
USPC ............................ 74/116, 118, 142; 414/592
See application file for complete search history.

(56) References Cited

U.S. PATENT DOCUMENTS

| | | | |
|---|---|---|---|
| 3,805,486 A | 4/1974 | Mahaffy et al. | |
| 3,808,772 A | 5/1974 | Turtschan | |
| 4,064,676 A | 12/1977 | King et al. | |
| 4,094,127 A | 6/1978 | Romagnoli | |
| 4,883,419 A | 11/1989 | Queirel | |
| 4,894,977 A | 1/1990 | Rittinger et al. | |
| 4,897,985 A | 2/1990 | Buchko et al. | |
| 4,915,283 A | 4/1990 | Buchko et al. | |
| 4,938,001 A | 7/1990 | Vico | |
| 4,951,444 A | 8/1990 | Epstein et al. | |
| 4,999,979 A | 3/1991 | Vicq | |
| 5,170,611 A | 12/1992 | Buchko et al. | |
| 5,205,110 A * | 4/1993 | Buchko ................... | B26D 5/00 53/453 |
| 5,517,805 A | 5/1996 | Epstein | |
| 6,085,497 A | 7/2000 | Natterer | |
| 7,833,002 B2 | 11/2010 | Buchko et al. | |
| 2003/0042862 A1 | 3/2003 | O'Connor et al. | |
| 2004/0050020 A1 | 3/2004 | Hanson et al. | |

OTHER PUBLICATIONS

"Thermoforming", Modern Plastic Encyclopedia 1986-1987, Dave Irwin, pp. 322-330.
Klockner-Hooper Packaging Machines/Model 4000 advertisement, Nov. 1988.
Irwin Research Development, In. Engineering Drawing for Main Drive Assembly dated Oct. 23, 1984.
Irwin Research Development, In. Engineering Drawing for Platen Assembly dated Oct. 23, 1984.

* cited by examiner

US 10,961,093 B2

SIMPLIFIED LIFT MECHANISM FOR A PACKAGING MACHINE

CROSS-REFERENCE TO RELATED APPLICATION

This application claims priority to U.S. provisional patent application Ser. No. 62/545,025, filed Aug. 14, 2017, the entirety of which is incorporated herein by reference.

BACKGROUND

A well-known type of packaging machine involves advancing web material through the machine, typically in an indexing manner, with various operations being performed by the machine on the web material as it is advanced through the machine. For example, in a typical machine, forming tooling first acts on a lower web of material to form the lower web to define a series of cavities. The cavities are then loaded with the product being packaged, and an upper web is then supplied to overlie the loaded cavities. The upper web is then sealed to the lower web, and the sealed webs are severed about the sealed cavities to form individual packages. In some cases, the cavity atmosphere may be modified, such as in a gas flush or evacuation process, before the cavity is sealed. Packaging machines such as this, as well as other types of machines that are used in packaging and other applications, require various components to move upwardly and downwardly during the process. Traditionally, this is achieved using complicated lift mechanisms. For instance, many such machines require equipment located at all four corners of the lift system. In turn, this results in lift points located in the four corners of the lift system. Oftentimes, the equipment consists of two-link systems, which are complicated to use. These complications are exacerbated where four separate two-link systems are used in tandem to result in coordinated movement in upward and downward directions. As a result, issues with any one of the four systems can render the lift mechanism inoperable. Similar issues exist for many other types of machines that required various components to be repeatedly moved from a first position to a second position, including in upward and downward positions or side-to-side positions.

SUMMARY OF THE INVENTION

According to one aspect of the invention, a lift mechanism for a machine is provided including a base, a frame structure, and a lift arrangement interposed between the base and the frame structure for lifting and lowering the frame structure relative to the base about a single lift point.

According to another aspect of the invention, a lift mechanism is provided that also includes a motor, a plurality of shafts, and at least one link arm rotatably attached to at least one of the plurality of shafts. For instance, the plurality of shafts may include a drive shaft associated with the base and a second shaft associated with the frame structure. Additionally, the at least one link arm may include a drive link having a first end, a second end, and an arm. The drive shaft may extend through the first end of the drive link and the drive shaft may be fixedly connected to the first end of the drive link. Also, the arm may have a first end rotatably connected to the second end of the drive link and a second end rotatably connected to the second shaft. The rotary motion from the motor may be transmitted to at least one of the plurality of shafts, such as the drive shaft. Additionally, rotation of the at least one link arm may cause the frame structure to move vertically relative to the base. By way of example, the at least one link arm may be rotated by the drive shaft, which in turn results in the second shaft being moved vertically by the at least one link arm. Further still, the lift mechanism may include at least one guide track mounted to the frame structure and at least one guide track receiver mounted to the base that is compatible with the at least one guide track. The guide track and the guide track receiver may guide upward and downward movement of the frame structure relative to the base.

According to another aspect of the invention, a simplified lift mechanism for a machine is provided including a drive carriage with a stationary base and a movable frame structure having a first wall and a second wall. The simplified lift mechanism may also include a motor, a drive member, a driven member, a drive belt, a drive shaft, a drive link, a substantially v-shaped arm, and a second shaft. The drive member may be configured to rotate in response to operation of the motor, and the drive belt may be engaged with the drive member and the driven member such that rotation of the drive member results in rotation of the driven member. Additionally, the drive shaft may extend from the driven member across the drive carriage. Thus, rotation of the driven member also results in rotation of the drive shaft. The drive link may have first and second ends, and the drive shaft extends through and is fixedly connected to the first end. As such, rotation of the drive link also results in rotation of the drive shaft. The substantially v-shaped arm also has a first end, a second end, and a middle segment located therebetween. The first end may be rotatably connected to the second end of the drive link. Further still, the second shaft may extend through and be rotatably connected to the second end of the v-shaped arm and to the first wall and the second wall. Therefore, when the drive link is rotated, the v-shaped arm moves the frame structure vertically relative to the base when the motor is actuated. The geometry of the substantially v-shaped arm and the drive link allow the rotary motion of the drive member to be translated into linear vertical motion.

In accordance to another aspect of the invention, bearings and guide tracks may be provided to facilitate movement of the frame structure relative to the base. For instance, the second shaft may have bearings located at either end that can be fitted within a first circular opening in the first wall and a second circular opening in the second wall. Additionally, the substantially v-shaped arm may rotate relative to the drive carriage about the bearings. Further still, guide tracks may be located in corners of the frame structure that are compatible with guide track receivers of the base.

In accordance with yet another aspect of the invention, a method of operating a lift mechanism for a machine is provided. A first end of a drive link that is fixedly attached to a drive shaft associated with a base may initially be rotated in a first direction. A second end of the drive link will simultaneously be rotated from a lowered position to a raised position. When this occurs, a second shaft associated with a movable frame structure is moved in an upward direction. This vertical movement occurs about a single lift point. Additionally, an arm with a first end rotatably connected to the second end of the drive link may be rotated in an upward direction. In turn, the second end of the arm that is rotatably attached to the second shaft is also moved in an upward direction.

Additionally, the first end of the drive link may be rotated in a second direction, which also causes the second end of the drive link to rotate from a raised position to a lowered position. As this happens, the second shaft is moved in a downward direction. Again, this occurs about a single lift point.

Also, a motor can be powered to cause a drive pulley to be rotated in a first direction. This rotary motion may be translated via a drive belt to a driven pulley. The rotation of the driven pulley may cause the movable frame structure to move in an upward direction. Similarly, when the drive pulley is rotated in a second direction opposite the first direction, the rotary motion can be translated to the drive pulley by the drive belt. This causes the movable frame structure to move in a downward direction.

Other aspects, features and advantages of the invention will become apparent to those skilled in the art from the following detailed description and accompanying drawings. It should be understood, however, that the detailed description and specific examples, while indicating certain embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention will become more readily apparent by referring to the exemplary, and therefore non-limiting, embodiments illustrated in the drawings accompanying and forming a part of this specification, wherein like reference numerals designate the same elements in the several views.

In the drawings.

Figure 1:
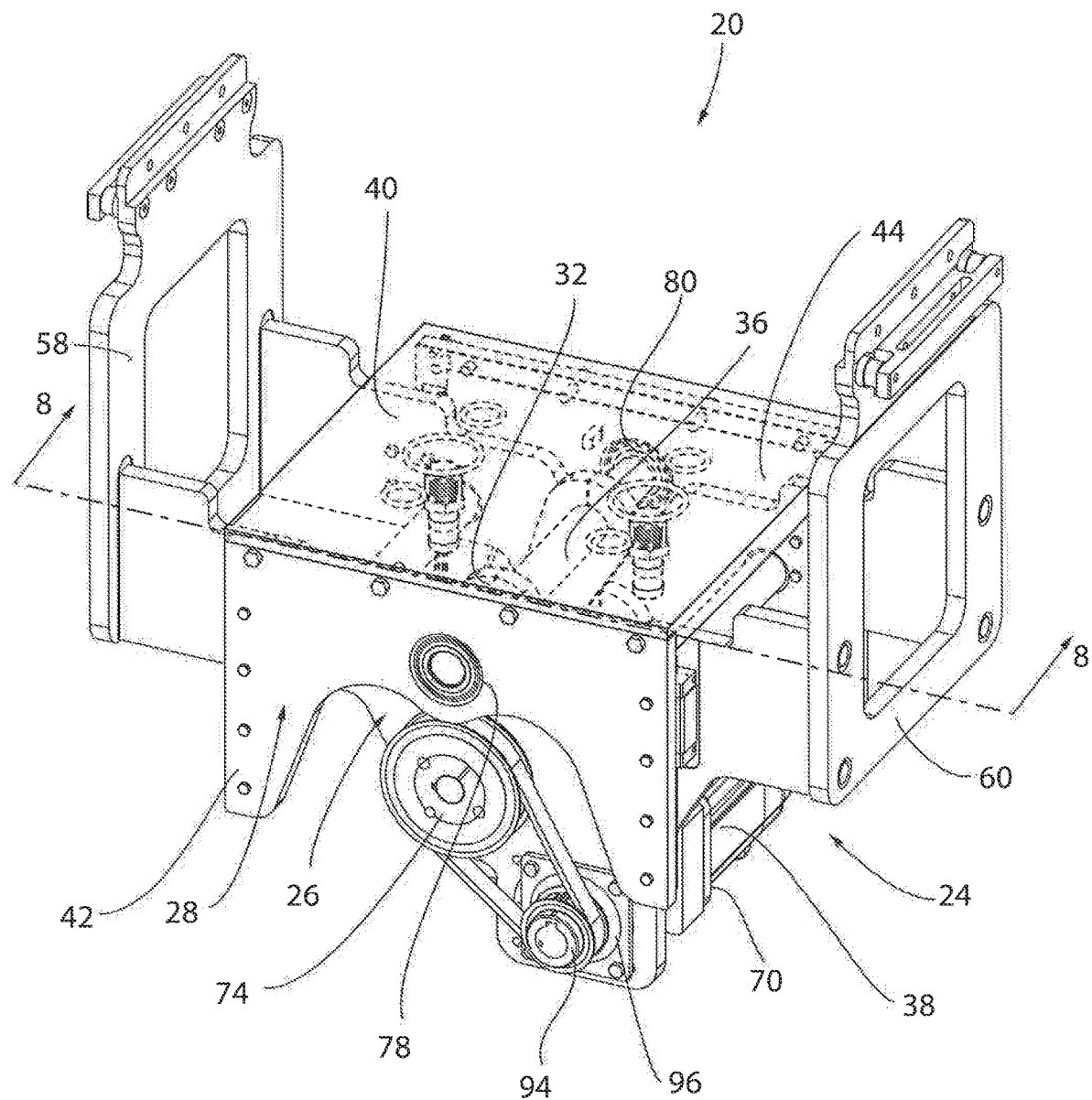
FIG. 1 is an isometric view of a simplified lift mechanism for use with a machine, such as a packaging machine, in a lowered position.

In describing the embodiments of the invention which are illustrated in the drawings, specific terminology will be resorted to for the sake of clarity. However, it is not intended that the invention be limited to be specific terms so selected and it is to be understood that each specific term includes all technical equivalents which operate in a similar manner to accomplish a similar purpose. For example, the words "connected," "attached," or terms similar thereto are often used. They are not limited to direct connection or attachment, but include connection or attachment to other elements where such connection or attachment is recognized as being equivalent by those skilled in the art

DETAILED DESCRIPTION OF THE INVENTION

The various features and advantageous details of the subject matter disclosed herein are explained more fully with reference to the non-limiting embodiments described in detail in the following description.

Figure 2:
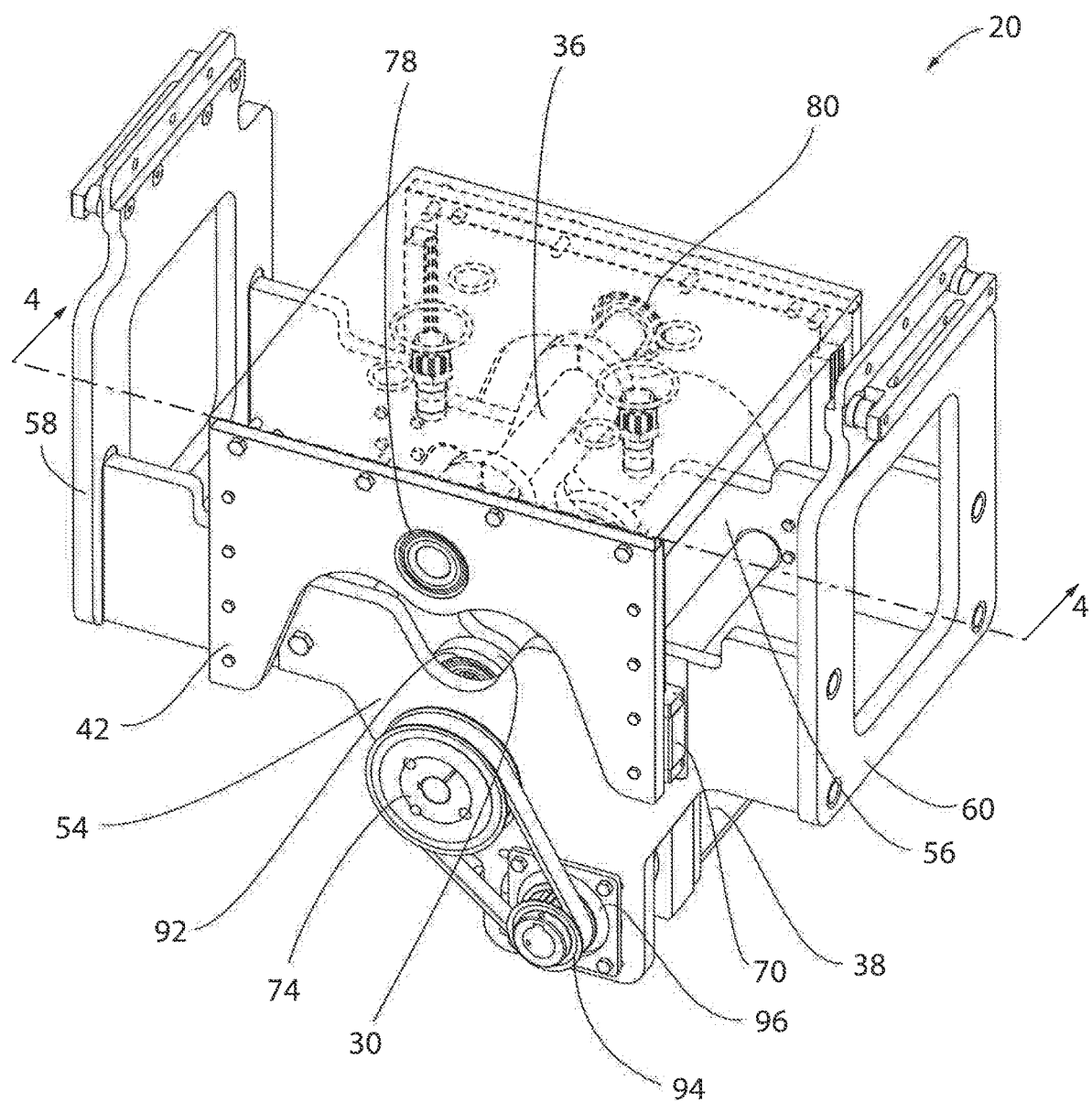
FIG. 2 is an isometric view the simplified lift mechanism of FIG. 1 in a raised position.
Figure 3:
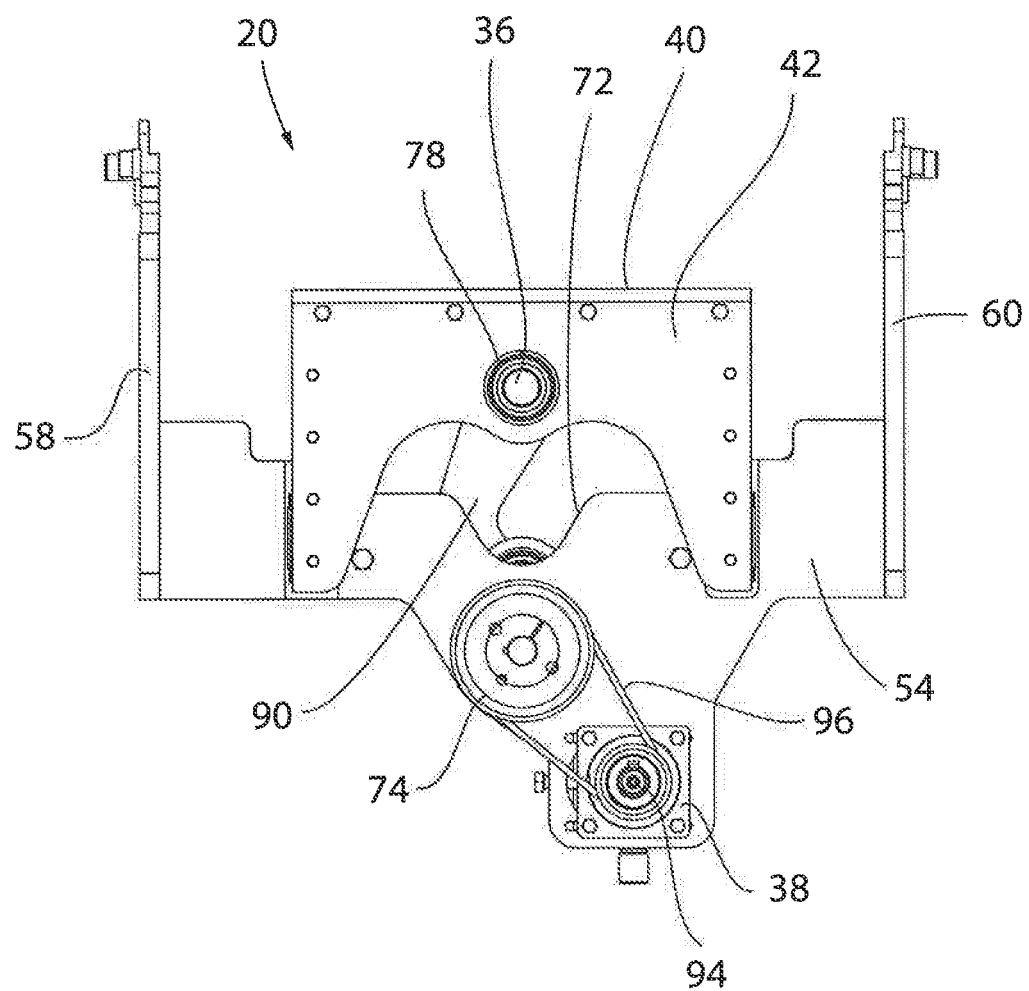
FIG. 3 is a side elevation view of the simplified lift mechanism of FIG. 2 in the raised position.
Figure 4:
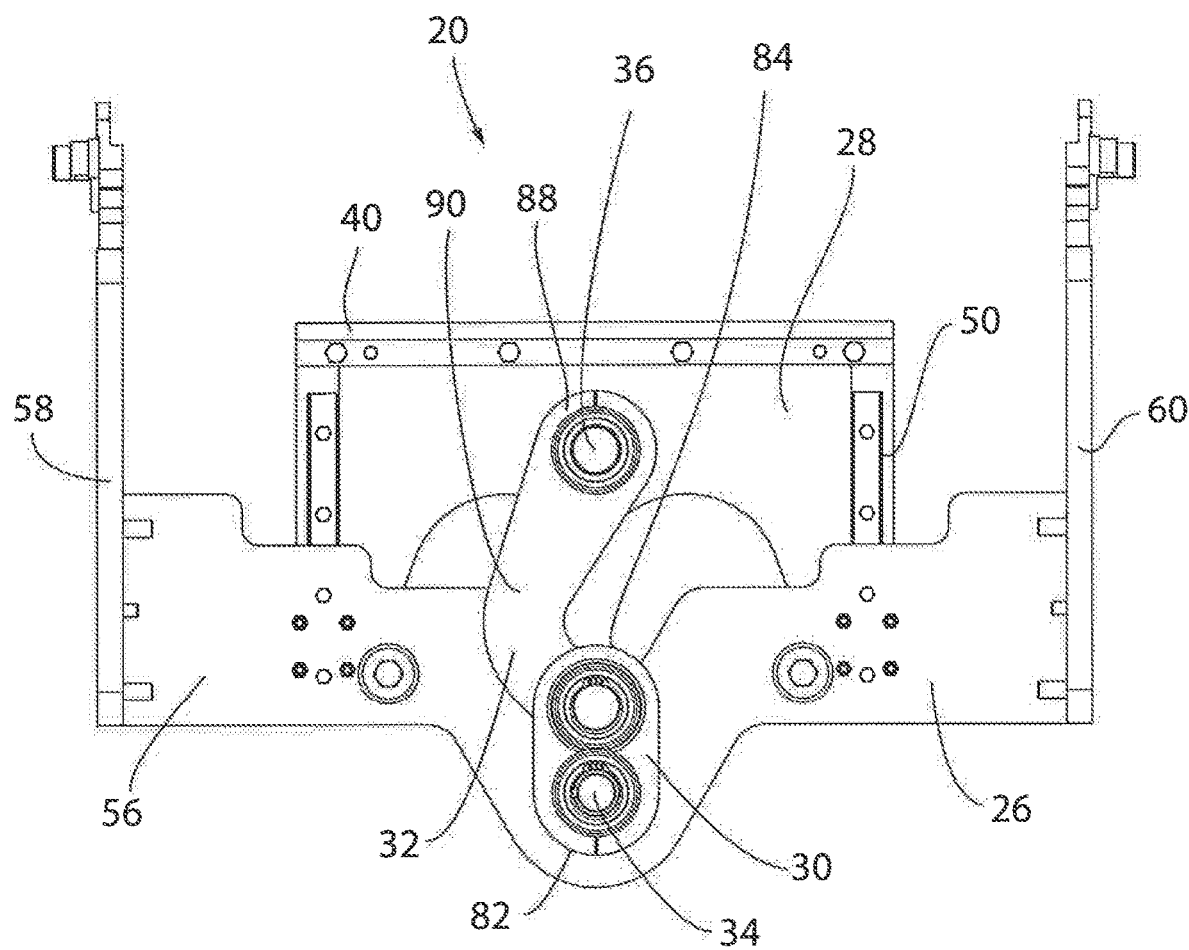
FIG. 4 is a cross-sectional view of the simplified lift mechanism in the raised position taken along line 4-4 of FIG. 2.

Referring to the following description in which like reference numerals represent like parts throughout the disclosure, a simplified lift mechanism 20 for use in a machine, such as a packaging machine, is shown. Examples of possible packaging machines in connection with which the simplified lift mechanism 20 could be used include those shown in U.S. Pat. No. 7,934,362, which is incorporated herein in full by reference. The lift mechanism 20 may be used to reciprocally move a component of the machine, such as but not limited to a vacuum box 22 that rests atop the lift mechanism 20, between a lowered position, as shown in FIG. 1, and a raised position, as shown in FIGS. 2-4. The lift mechanism 20 has a drive carriage 24 with a stationary base 26, a top frame structure 28 that is movable relative to the stationary base 26, a drive link 30, an arm, such as a substantially v-shaped arm 32 as shown in the figures, a first drive shaft 34 and a second shaft 36. The drive link 30 and the substantially v-shaped arm 32 are rotated relative to one another to move the top frame structure 28, and the drive shaft 34 and the second shaft 36 transmit rotational forces from a motor 38 to the drive link 30 and the substantially v-shaped arm 32. Each of these components will be further described below.

Figure 9:
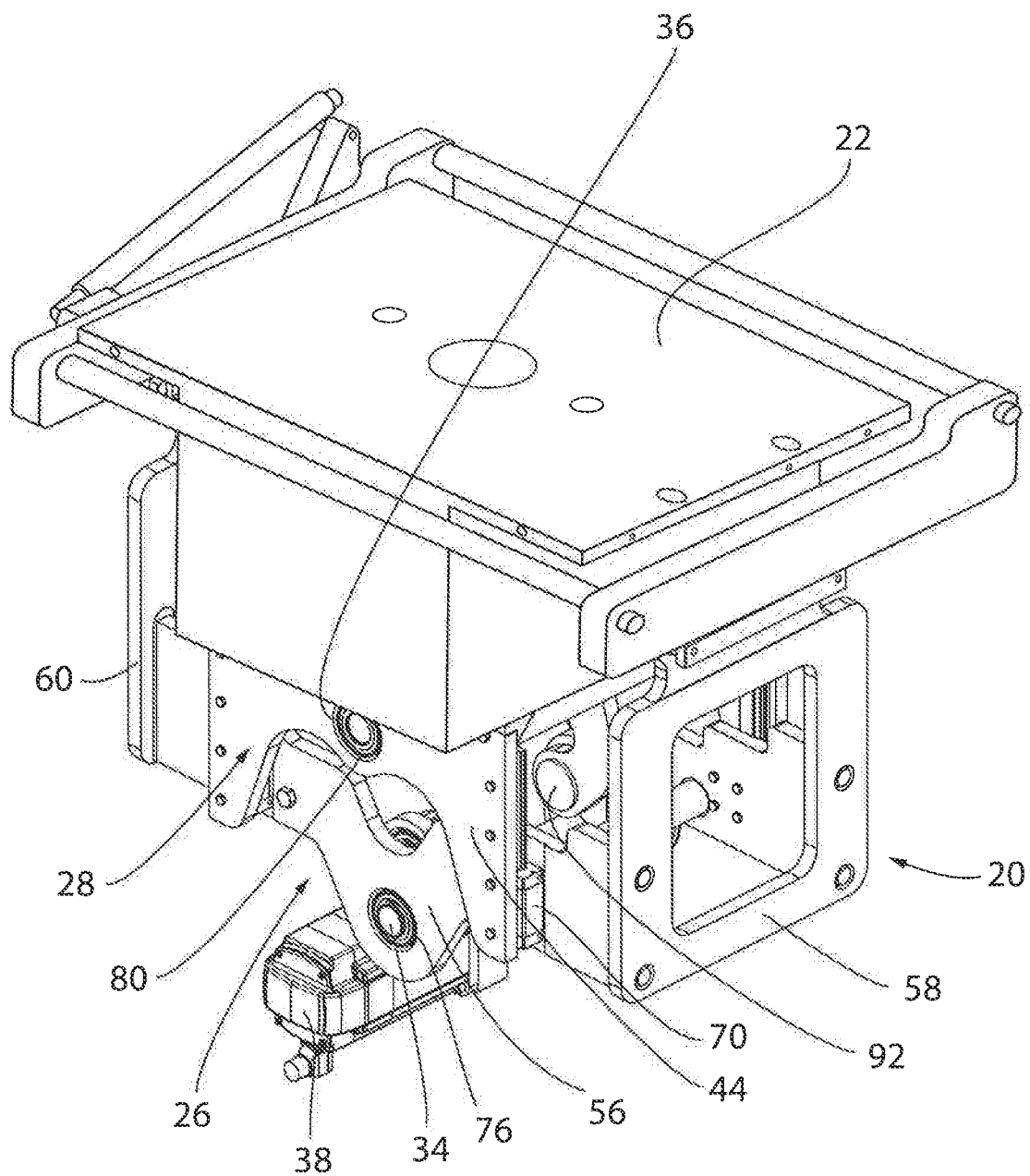
FIG. 9 is an isometric view of the simplified lift mechanism with a component of a machine mounted thereto.
Figure 10:
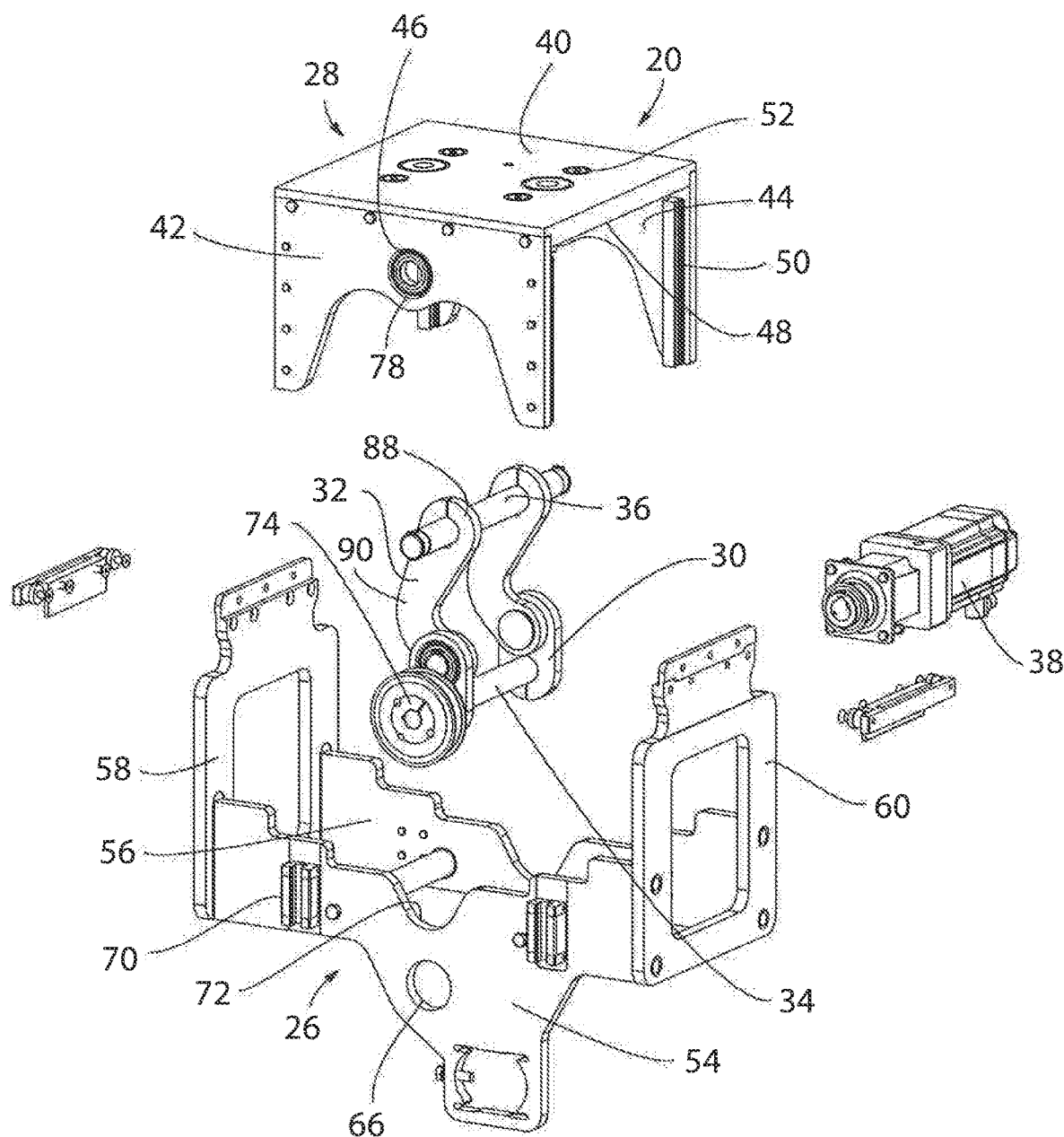
FIG. 10 is an exploded isometric view of the components of the simplified lift mechanism.

Looking to FIG. 10, the movable top frame structure 28 has a generally rectangular top plate 40 and a first side wall 42 and a second side wall 44, located opposite the first side wall 42, that extend downwardly from the top plate 40. The top plate 40 may be configured to support a vacuum box 22, such as shown in FIG. 9. Additionally, the first side wall 42 of the top frame structure 28 has a first circular opening 46 formed therein, and the second side wall 44 has a second circular opening 48 formed therein located directly opposite the first circular opening 46. As shown, these circular openings 46, 48 may be centrally-located about the first side wall 42 and the second side wall 44. Further, the movable top frame structure 28 includes guide tracks 50 located at each of the four corners of the structure 28. Additional openings 52 may be formed in the top plate 40, which enable various components, such as the vacuum box 22, to be securely mounted to the top frame structure 28.

Turning back to FIG. 10, the stationary base 26 also has a first side wall 54 and a second side wall 56 opposite the first side wall 54 with two connector plates 58, 60 extending from the first side wall 54 to the second side wall 56 at either end 62, 64 of the stationary base 26. Like the top frame structure 28, the stationary base 26 also has circular openings 66, 68 formed in the first side wall 54 and the second side wall 56, where the openings 66, 68 are located directly opposite one another. Again, these circular openings 66, 68 may be centrally-located about the first side wall 54 and the second side wall 56, and midway between the connector plates 58, 60 of the stationary base 26. Additionally, the stationary base 26 may include various guide track receivers 70. For instance, as shown, guide track receivers 70 may extend outwardly from the first side wall 54 and the second side wall 56 to engage with each of the four guide tracks 50. Further still, the stationary base 26 may have semi-circular recesses 72 located at the top edge of the first side wall 54 and the second side wall 56. These semi-circular recesses 72 may be centrally located about the first side wall 54 and the second side wall 56 midway between the connector plates 58, 60, and are configured to accommodate the second shaft 36 when the top frame structure 28 is in a lowered position, as can best be seen in FIG. 1.

The movable top frame structure 28 is movably connected to the stationary base 26. More specifically, the guide tracks 50 are configured to be slidably received within the guide track receivers 70. The guide tracks 50 and receivers 70 may be in the form of linear bearings, although it is understood that any satisfactory guide arrangement may be employed. The guide tracks 50 and guide track receivers 70 guide upward and downward movement of the movable top frame structure 28 relative to the stationary base 26, in a manner to be explained.

Additionally, the stationary base 26 and the movable top frame structure 28 are complementary in shape to one another, allowing the movable top frame structure 28 to initially be nested directly around the base 26 as shown in FIG. 1 before it is raised away from the base 26 along the guide tracks 50. Of course, the movable top frame structure 28 could similarly be nested directly within the base 26 before it is raised away from the base 26 along the guide tracks 50. As shown, the distance between the first side wall 42 and the second side wall 44 of the top frame structure 28 is greater than the distance between the first side wall 54 and second side wall 56 of the base 26 to enable the nested configuration of the stationary base 26 and the movable top frame structure 28.

Both the base 26 and the top frame structure 28 have a shaft rotatably associated therewith. Looking initially to the base 26, the drive shaft 34 extends from the first side wall 54 of the base 26 to the second side wall 56 of the base 26. On the first side wall 54, the drive shaft 34 extends past the side of the base 26 through the first circular opening 66, and a driven pulley 74 is fixedly connected to the drive shaft 34 on the outside of the first side wall 54. The driven pulley 74 is concentric with the drive shaft 34 such that when the pulley 74 is rotated, the drive shaft 34 in turn will rotate. On the opposite side, the drive shaft 34 is rotatably connected to the second side wall 56. For instance, the drive shaft 34 could have a bearing 76 installed on the second end, where the bearing 76 is inserted into the second circular opening 68. As such, the drive shaft 34 is rotatable about the base 26.

Looking to the top frame structure 28, the second shaft 36 extends from the first side wall 42 of the top frame structure 28 to the second side wall 44 of the top frame structure 28. Both ends of the second shaft 36 are rotatable about the top frame structure 28. For instance, both ends of the second shaft 36 can have bearings 78, 80 that are inserted into the first and second circular openings 46, 48 formed in the first and second side walls 42, 44 of the top frame structure 28. Because each of the openings 46, 48 is centrally-located, the centers of the drive shaft 34 and the second shaft 36 are located directly vertically relative to one another.

Figure 11:
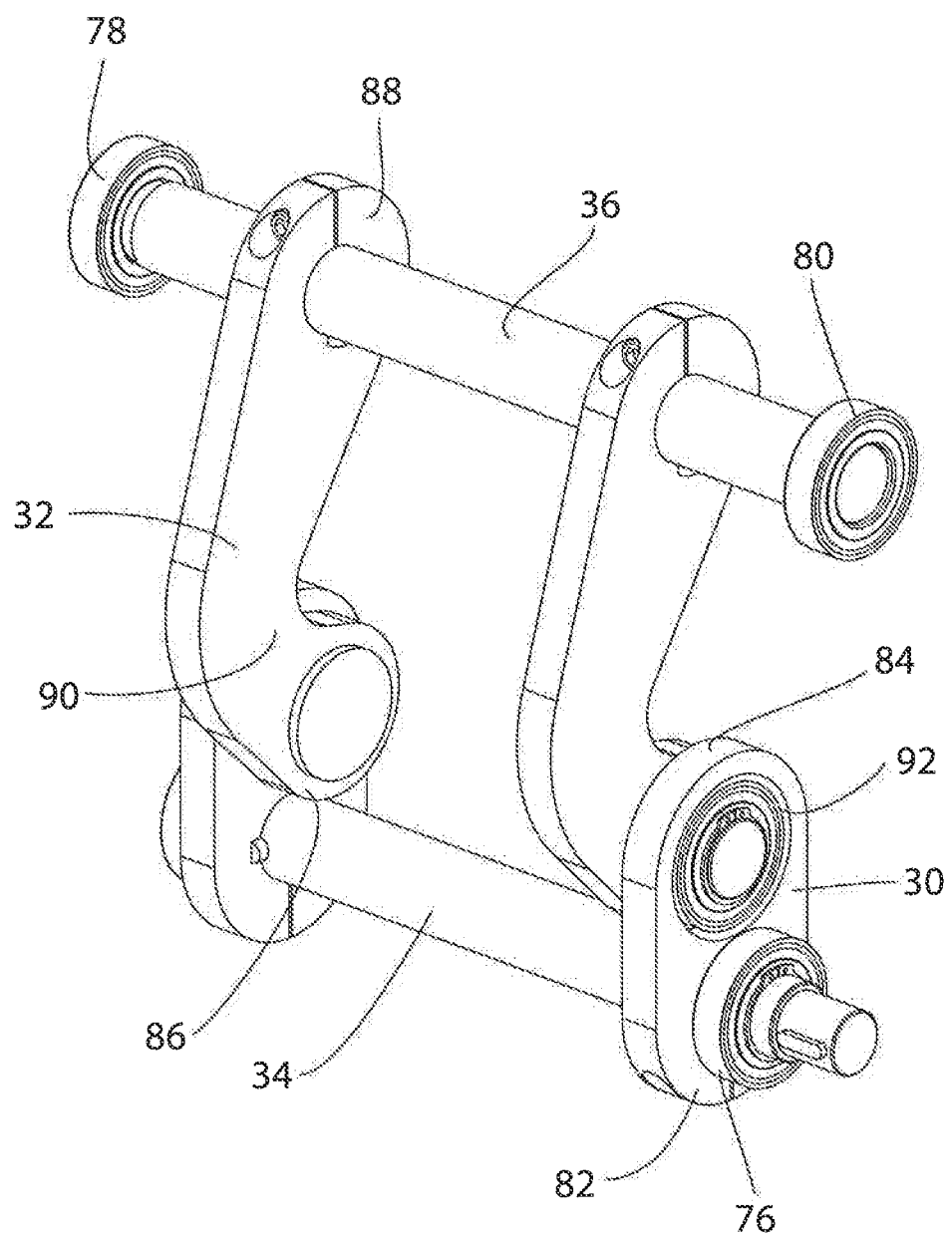
FIG. 11 is an isometric view of a drive link associated with the simplified lift mechanism.
Figure 12:
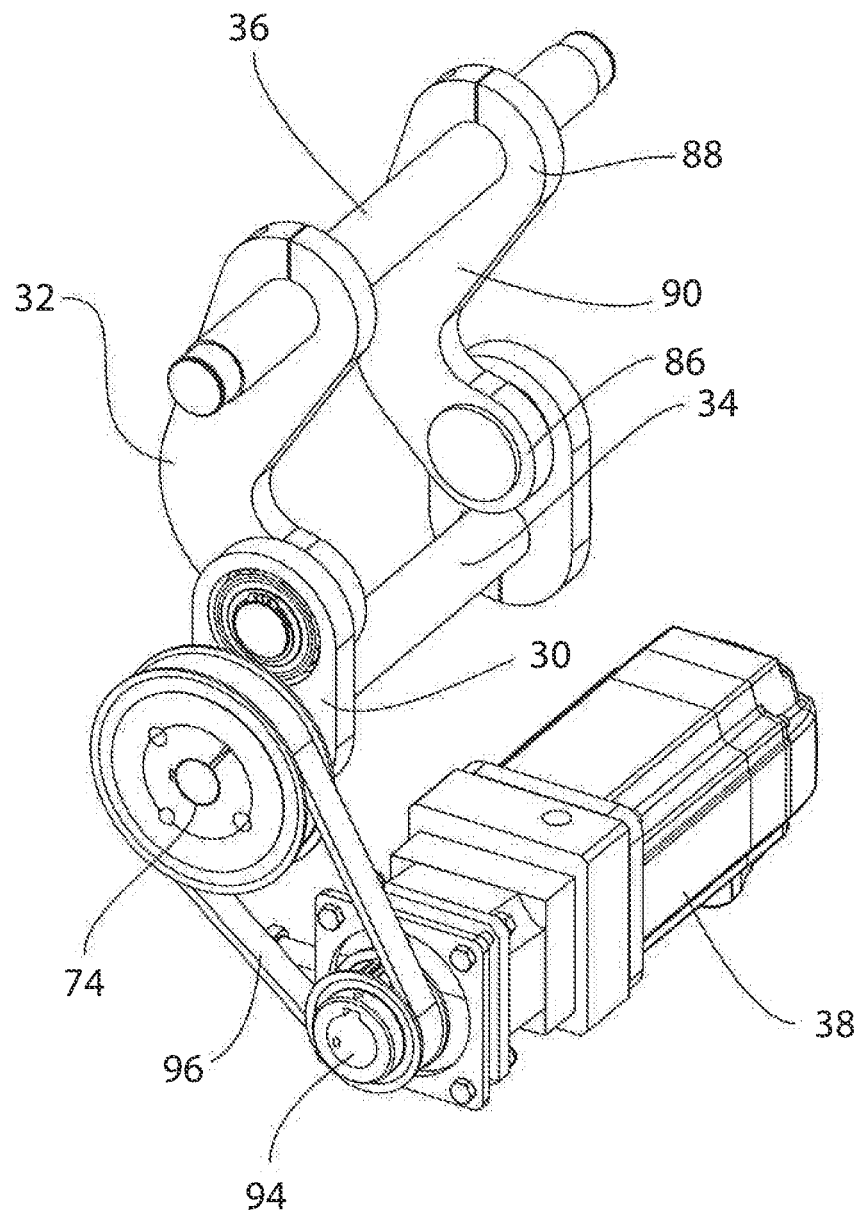
FIG. 12 is an isometric view of the drive link in connection with a driven pulley, a motor, and a drive pulley.

The simplified lift mechanism 20 also features the drive link 30, as can best be seen in FIG. 11. While only one drive link 30 will be described, as shown, a second drive link, which would be of substantially identical construction, could be included on the opposite side of the drive carriage 24. Of course, the simplified lift mechanism 20 could include additional drive links having similar or identical construction to the drive link 30 described here to further strengthen or increase the lifting capacity of the simplified lift mechanism 20. As shown, the drive link 30 may be substantially oval in shape, with a first end 82 and a second end 84. Of course, the drive link 30 could be any number of different shapes, including rectangular. A first opening (not shown) is formed in the first end 82 of the drive link 30 and a second opening (not shown) is formed in the second end 84. The drive shaft 34 extends through the first opening of the drive link 30 and is fixedly attached thereto. As a result, when the drive shaft 34 is rotated, the drive link 30 is rotated about the first opening. This allows the second end 84 of the drive link 30 to be pivotably moved from a lowered position in which it is substantially vertically beneath the first end 82 (see FIGS. 1 and 8), to a series of intermediate positions (see FIGS. 5-7) including a position in which it is horizontal relative to the first end 82 (see FIG. 6), and finally to a raised position in which it is substantially vertically above the first end 82 (see FIGS. 2-4 and 9).

Next, the substantially v-shaped arm 32 will be further described, which can also best be seen in FIG. 11. While only one substantially v-shaped arm 32 will be described, as shown, the simplified lift mechanism 20 could have two substantially v-shaped arms located at either end of the drive carriage 24 for added support. Of course, additional substantially v-shaped arms could be provided having similar or identical construction to the substantially v-shaped arm 32 described here. The substantially v-shaped arm 32 includes a first end 86, a second end 88, and a valley portion 90 therebetween. Both the first end 86 and the second end 88 have openings (not shown) formed therein. The first end 86 of the substantially v-shaped arm 32 is rotatably attached to the second end 84 of the drive link 30, for instance using a bearing connection 92 that fits within the opening formed in first end 86 of the substantially v-shaped arm 32 and the second opening formed in the second end 84 of the drive link 30. This allows the first end 86 of the substantially v-shaped arm 32 to move from a lowered position in which the valley portion 90 receives the drive shaft 34 as shown in FIG. 1, to a raised position in which the valley portion 90 is located directly above the drive shaft 34, as shown in FIGS. 2-4. Additionally, the second shaft 36 extends through the opening formed in the second end 88 of the substantially v-shaped arm 32. The second end 88 of the substantially v-shaped arm 32 is fixedly-connected to the second shaft 36. As a result, the second end 88 of the substantially v-shaped arm 32 rotates along with the second shaft 36 about the bearings 78, 80 located within the first and second openings 46, 48 formed in the top frame structure 28.

The simplified lift mechanism 20 additionally includes the motor 38 with a drive pulley 94 that rotates in response to operation of the motor 38. A drive belt 96 wraps around the drive pulley 94 and the driven pulley 74 such that the drive pulley 94 and the driven pulley 74 simultaneously rotate. As a result, the rotational movement is transferred from the drive pulley 94 to the driven pulley 74, and in turn, the drive shaft 34.

Because of the geometry and the double-jointed nature of the drive link 30 and the substantially v-shaped arm 32, rotation of the first end 82 of the drive link 30 results in rotation of the substantially v-shaped arm 32. As the drive link 30 and the substantially v-shaped arm 32 rotate, the entire top frame structure 28 moves linearly upwardly or downwardly relative to the base 26 using a single lift point.

Thus, the rotational movement of the drive pulley 94 is translated into linear vertical motion.

Figure 5:
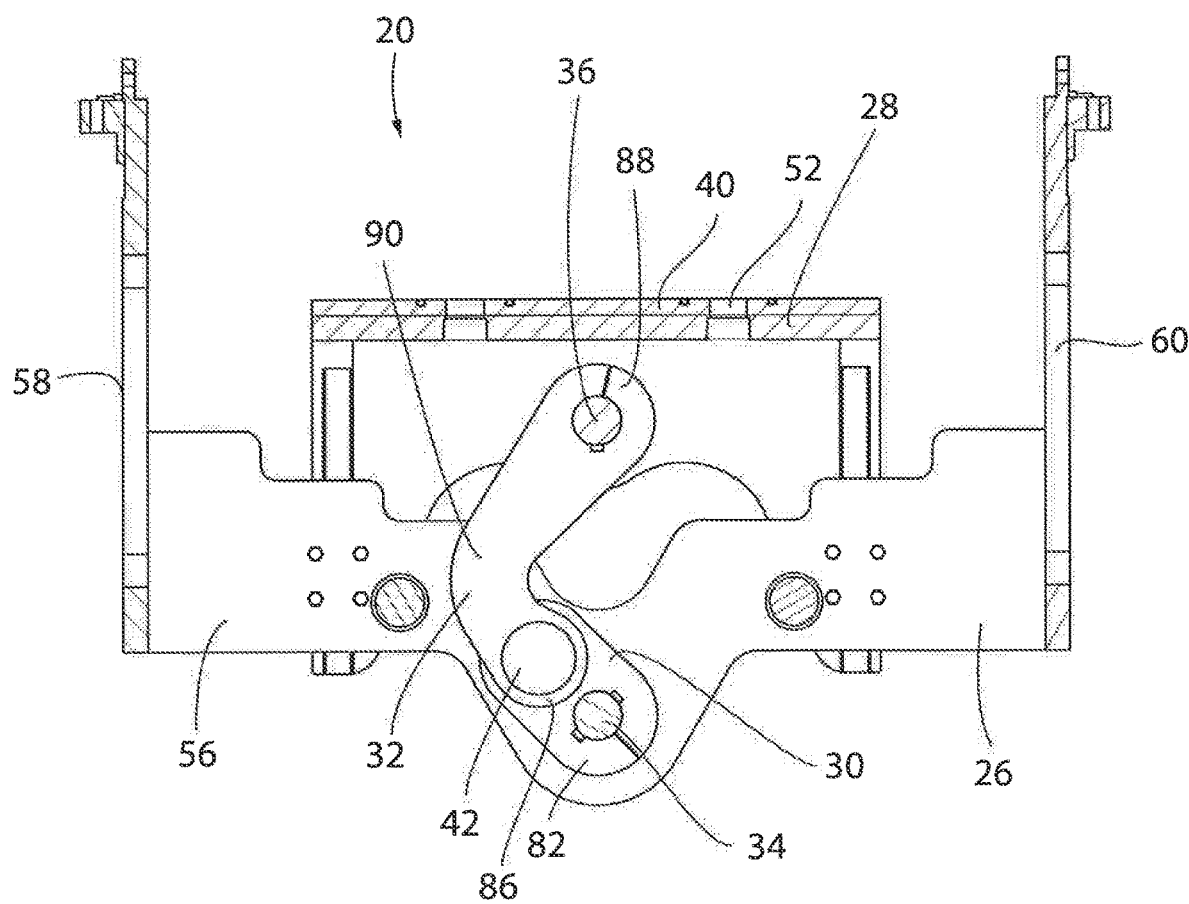
FIG. 5 is a cross-sectional view of the simplified lift mechanism of FIGS. 1-4 in a first intermediate position between the lowered position and the raised position.
Figure 6:
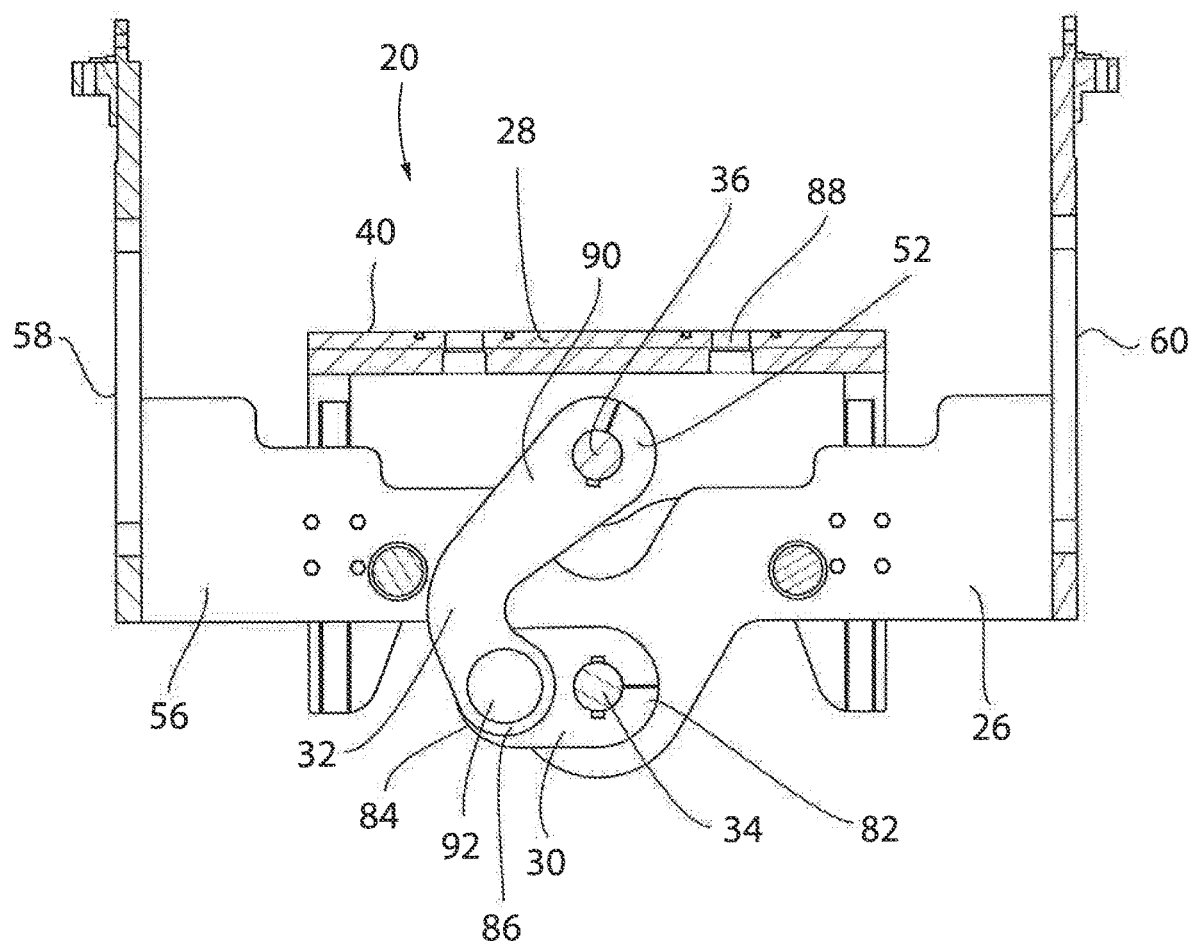
FIG. 6 is a cross-sectional view of the simplified lift mechanism of FIGS. 1-5 in a second intermediate position between the lowered position and the raised position.
Figure 7:
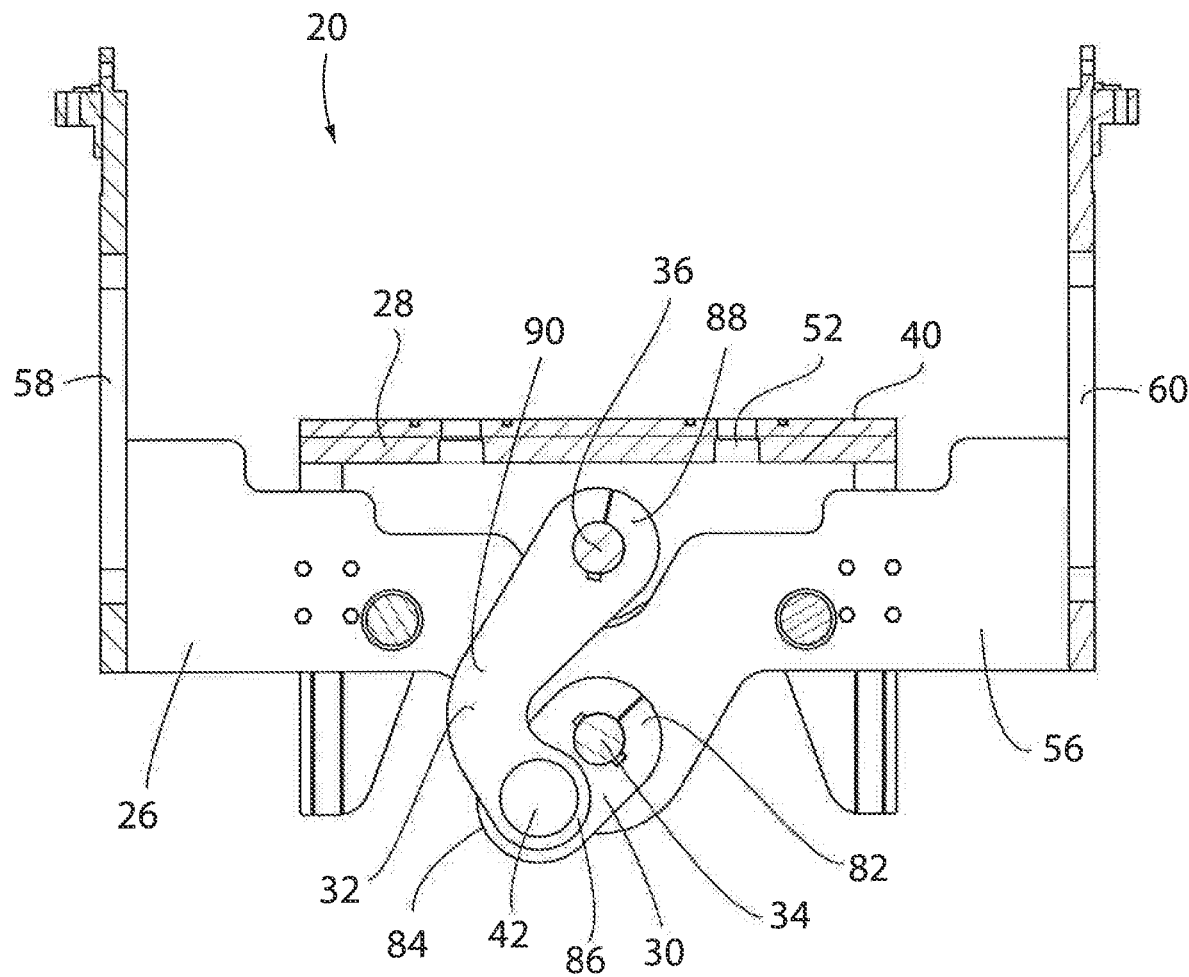
FIG. 7 is a cross-sectional view of the simplified lift mechanism of FIGS. 1-6 in a third intermediate position between the lowered position and the raised position.
Figure 8:
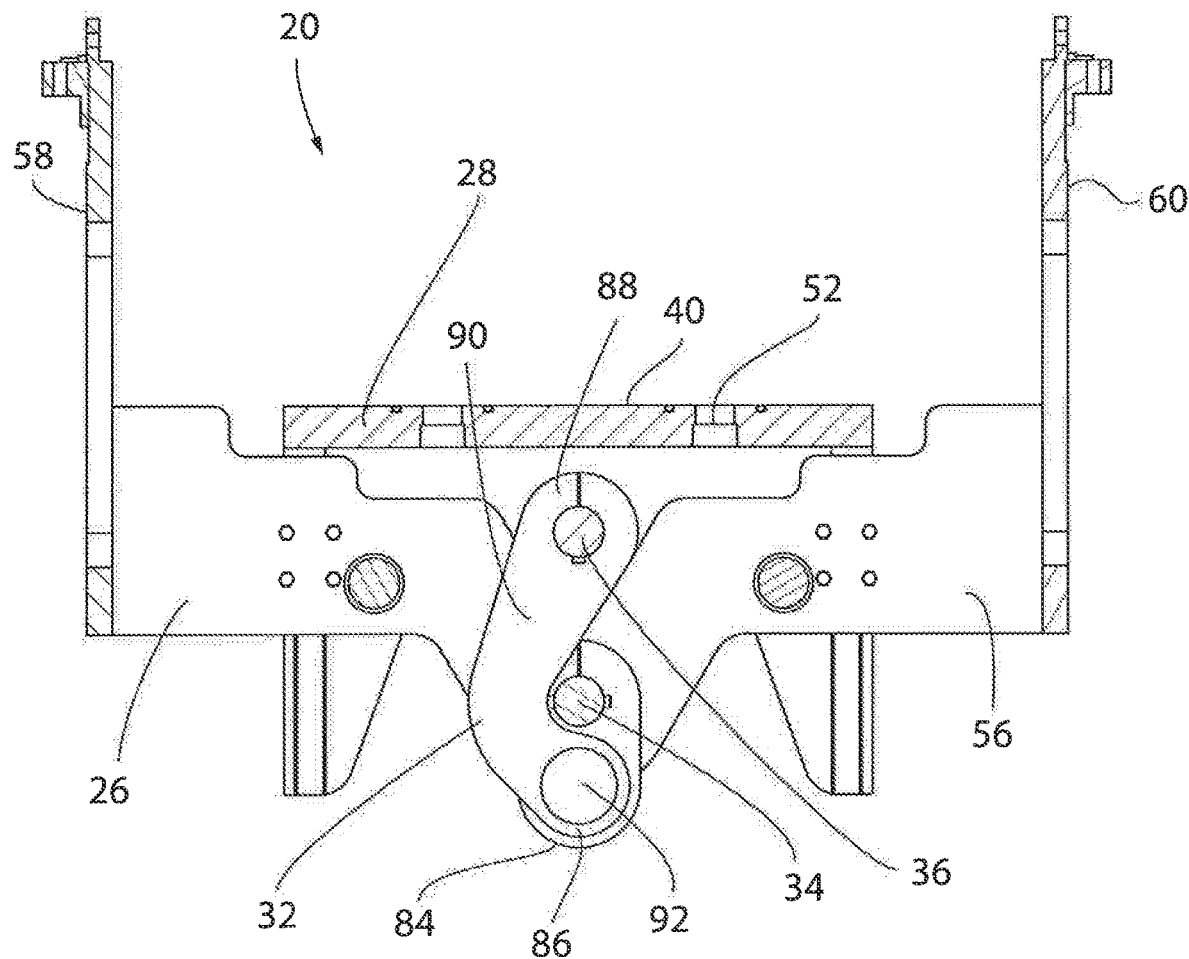
FIG. 8 is a cross-sectional view of the simplified lift mechanism in the lowered position taken along line 8-8 of FIG. 1.

Operation of the simplified lift mechanism 20 will now be described. Initially, the drive carriage 24 is in a lowered position as shown in FIGS. 1 and 8. When in the lowered position, the top frame structure 28 is located directly above and is nested about the base 26. Additionally, the drive shaft 34 is received within the valley portion 90 of the substantially v-shaped arm 32. Also, when in the lowered position, the second end 84 of the drive link 30 is located directly beneath the first end 82 of the drive link 30. Upon operation of the motor 38, the drive pulley 94 moves clockwise. As the drive pulley 94 moves clockwise, the drive belt 96 translates the clockwise motion to the driven pulley 74 and the drive shaft 34. This also causes the drive link 30 to move clockwise about the first end from the initial position. As the first end 82 of the drive link 30 is moved clockwise, the second end 84 rotates upwardly in a clockwise direction. Because the first end 86 of the substantially v-shaped arm 32 is connected to the second end 84 of the drive link 30, the first end 86 of the substantially v-shaped arm 32 also rotates upwardly, as does the rest of the substantially v-shaped arm 32. As a result of the second end 88 of the substantially v-shaped arm 32 being connected to the second shaft 36, the second shaft 36 also moves upwardly. The top frame structure 28 also moves upwardly due to its connection to the second shaft 36 about the bearings 78, 80. Such upward movement of the top frame structure 28 is guided by the guide tracks 50 and guide track receivers 70, which are oriented parallel to the direction of movement of the second shaft 36. Therefore, the clockwise motion of the drive pulley 94 results in the entire top frame structure 28 moving upwardly relative to the base 26 as seen in FIGS. 5-7, to a raised position, as seen in FIGS. 2-4.

When in the raised position, the second end 84 of the drive link 30 is located directly vertically above the first end 82 of the drive link 30. Additionally, the second end 88 of the substantially v-shaped arm 32 is located vertically directly above the first end 86 of the substantially v-shaped arm 32.

To return the top frame structure 28 to the lowered position, the drive pulley 94 is moved counter-clockwise. Because the counter-clockwise movement of the drive pulley 94 is transmitted to the driven pulley 74 by the drive belt 96, the drive shaft 34 as well as the first end 82 of the drive link 30 also rotate in a counter-clockwise direction. This causes the second end 84 of the drive link 30 and the second end 88 of the v-shaped arm 32, as well as the top frame structure 28, to move downwardly, with such movement being guided by the guide tracks 50 and guide track receivers 70. Ultimately, the drive carriage 24 is returned to the lowered position in which the second end 84 of the drive link 30 and the first end 86 of the substantially v-shaped arm 32 return to a position directly beneath the drive shaft 34 and the first end 82 of the drive link 30.

While the drive carriage 24 is in motion, the second end 84 of the drive link 30 and the first end 86 and valley portion 90 of the substantially v-shaped arm 32 translate horizontally and vertically with relation to the drive carriage 24. Other components, including the top frame structure 28, the second shaft 36, and the second end 88 of the substantially v-shaped arm 32, move only vertically while the drive carriage 24 is in motion. The remaining components, including the base 26, the motor 38, the drive pulley 94, the driven pulley 74, the drive shaft 34, and the first end 82 of the drive link 30 do not translate horizontally or vertically while the drive carriage 24 is in motion.

As described, the simplified lift mechanism 20 has a single lift point. In contrast, lifting machines found in the prior art can use up to four, and sometimes more, two-link systems located at the four corners of the machine. This system provides a simplified alternative that is easier to assemble, operate and maintain.

The simplified lift mechanism 20 of the present invention as shown and described may be used to lift and lower any machine component, and is particularly useful in an indexing motion-type machine. For example, in an indexing motion packaging machine, the simplified lift mechanism 20 may be use to lift and lower package forming tooling that acts on a web of material to create a cavity or pocket within which product(s) can be received. In addition, it should be understood that the simplified lift mechanism 20 may also be used to move machine components in any direction and is not limited to upward-downward movement as shown and described. Also, the simplified lift mechanism 20 could be used with any other machine components, including sealing evacuation chambers.

It should be understood that the above description, while indicating representative embodiments of the present invention, is given by way of illustration and not of limitation. Many changes and modifications may be made within the scope of the present invention without departing from the spirit thereof, and the invention includes all such modifications.

Various additions, modifications, and rearrangements are contemplated as being within the scope of the following claims, which particularly point out and distinctly claim the subject matter regarding as the invention, and it is intended that the following claims cover all such additions, modifications, and rearrangements.

We claim:

1. A mechanism for moving a component in a machine, comprising:

a support structure associated with the machine, wherein the support structure includes a pair of spaced apart side support members and wherein the component of the machine is located between the side support members;

an input shaft that is rotatable in response to operation of a motor, wherein the input shaft extends between and is rotatably supported by the side support members;

at least one drive member located between the side support members and having a first end and a second end, wherein the first end of the drive member is non-rotatably secured to the input shaft;

at least one actuator arm located between the side support members and having an upper end and a lower end, wherein the lower end of the actuator arm is rotatably secured to the second end of the drive member, and wherein the upper end of the actuator arm is secured to the component of the machine, wherein rotation of the input shaft in response to operation of the motor is translated into movement of the component of the machine through the drive member and the actuator arm; and a guide arrangement associated with the support structure of the machine and engaged with the component of the machine to guide movement of the component relative to the machine between a raised position and a lowered position upon movement of the component of the machine through the drive member and the actuator arm;

wherein operation of the motor provides reciprocating movement of the input shaft between a first rotational position in which the drive member and the actuator arm place the component of the machine in the raised position and a second rotational position in which the drive member and the actuator arm place the component of the machine in the lowered position, and wherein the actuator arm defines an input shaft receiving area within which the input shaft is positioned when the input shaft is in the second rotational position wherein the lower end of the actuator arm is positioned below the actuator shaft.

2. The mechanism of claim 1, wherein the at least one drive member comprises a pair of drive members and wherein the at least one actuator arm comprises a pair of actuator arms.

3. The mechanism of claim 1, wherein the first rotational position of the input shaft and the second rotational position of the input shaft are 180 degrees apart from each other.

4. The mechanism of claim 3, wherein the upper end of the actuator arm, the lower end of the actuator arm, and the input shaft are vertically aligned with each other both when the input shaft is in the first rotational position and the component of the machine is in the raised position and when the input shaft is in the second rotational position and the component of the machine is in the lowered position.

5. The mechanism of claim 1, wherein the actuator arm includes an upper portion that extends along a first longitudinal axis and a lower portion that extends along a second longitudinal axis oriented at an angle relative to the first longitudinal axis.

6. The mechanism of claim 5, wherein the upper and lower portions of the actuator arm have a generally V-shaped configuration that defines the input shaft receiving area.

7. A method of moving a component of a machine between a raised position and a lowered position, wherein the machine includes a support structure having a pair of spaced apart side support members, and wherein the component of the machine is located between the side support members, comprising the acts of:

rotating an input shaft in response to operation of a motor, wherein the input shaft extends between and is rotatably supported by the side support members, wherein at least one drive member is located between the side support members and has a first end and a second end, wherein the first end of the drive member is non-rotatably secured to the input shaft such that the drive member is pivotable about a pivot axis defined by the input shaft upon movement of the input shaft;

moving at least one actuator arm via movement of the drive member, wherein the actuator arm is located between the side support members and has an upper end and a lower end, wherein the lower end of the actuator arm is rotatably secured to the second end of the drive member, and wherein the upper end of the actuator alit is secured to the component of the machine, wherein rotation of the input shaft in response to operation of the motor is translated into movement of the component of the machine through the drive member and the actuator arm; and guiding movement of the component of the machine between a raised position and a lowered position via a guide arrangement associated with the support structure of the machine and engaged with the component of the machine, upon movement of the component of the machine through the drive member and the actuator arm;

operating the motor to provide reciprocating movement of the input shaft between a first rotational position in which the drive member and the actuator arm place the component of the machine in the raised position and a second rotational position in which the drive member and the actuator arm place the component of the machine in the lowered position; and wherein the actuator arm defines an input shaft receiving area within which the input shaft is positioned when the input shaft is in the second rotational position wherein the lower end of the actuator arm is positioned below the actuator shaft.

8. The method of claim 7, wherein the at least one drive member comprises a pair of drive members and wherein the at least one actuator arm comprises a pair of actuator arms.

9. The method of claim 7, wherein the first rotational position of the input shaft and the second rotational position of the input shaft are 180 degrees apart from each other.

10. The method of claim 9, wherein the upper end of the actuator arm, the lower end of the actuator arm, and the input shaft are vertically aligned with each other both when the input shaft is in the first rotational position and the component of the machine is in the raised position and when the input shaft is in the second rotational position and the component of the machine is in the lowered position.

11. The method of claim 7, wherein the actuator arm includes an upper portion that extends along a first longitudinal axis and a lower portion that extends along a second longitudinal axis oriented at an angle relative to the first longitudinal axis.

12. The mechanism of claim 11, wherein the upper and lower portions of the actuator arm have a generally V-shaped configuration that defines the input shaft receiving area.

* * * * *

UNITED STATES PATENT AND TRADEMARK OFFICE
CERTIFICATE OF CORRECTION

PATENT NO. : 10,961,093 B2
APPLICATION NO. : 16/102116
DATED : March 30, 2021
INVENTOR(S) : Raymond G. Buchko, Jr. et al.

Page 1 of 1

It is certified that error appears in the above-identified patent and that said Letters Patent is hereby corrected as shown below:

In the Claims

Claim 7, Column 10, Line 4, delete "alit" and substitute therefor -- arm --.

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*